(12) United States Patent
Kantharajah et al.

(10) Patent No.: US 11,082,319 B1
(45) Date of Patent: Aug. 3, 2021

(54) WORKLOAD SCHEDULING FOR DATA COLLECTION

(71) Applicant: Cisco Technology, Inc., San Jose, CA (US)

(72) Inventors: Roy Nidesh Kantharajah, La Crosse, WI (US); Ganesh Karthick Rajendran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/869,480

(22) Filed: May 7, 2020

(51) Int. Cl.
*H04L 12/26* (2006.01)

(52) U.S. Cl.
CPC .............................. *H04L 43/0882* (2013.01)

(58) Field of Classification Search
None
See application file for complete search history.

(56) References Cited

U.S. PATENT DOCUMENTS

| 7,020,678 | B1 | 3/2006 | Hubbard | |
|---|---|---|---|---|
| 10,146,584 | B2 | 12/2018 | Raj | |
| 2008/0140630 | A1* | 6/2008 | Sato | G06F 16/2454 |
| 2011/0154353 | A1 | 6/2011 | Theroux et al. | |
| 2014/0258527 | A1* | 9/2014 | Takenaka | H04L 67/2842 |
| | | | | 709/224 |
| 2016/0224392 | A1* | 8/2016 | Clarke | G06F 9/505 |
| 2018/0032829 | A1* | 2/2018 | Kim | G06K 9/00771 |
| 2018/0124165 | A1* | 5/2018 | Guerin | H04L 67/1004 |
| 2018/0176283 | A1* | 6/2018 | Sano | H04L 47/826 |
| 2018/0246942 | A1* | 8/2018 | Chen | H04L 43/024 |
| 2018/0359651 | A1* | 12/2018 | Mota | H04W 24/02 |
| 2019/0182317 | A1* | 6/2019 | Tao | H04L 67/1029 |
| 2020/0177685 | A1* | 6/2020 | Matsumoto | H04L 67/18 |

OTHER PUBLICATIONS

B. Nithya Nandhalakshmi Mahalingam, "Efficient Load Balancing in Cloud Computing Using Weighted Throttled Algorithm," Published Jun. 2015, in International Journal of Innovative Research in Computer and Communications Engineering (IJIRCCE), vol. 3, Issue 6, pp. 5409-5415.
Lin et al., "Multi-Round Real-Time Divisible Load Scheduling for Clusters," Published Dec. 2008, in ResearchGate, 5 pages.

\* cited by examiner

*Primary Examiner* — Joshua Joo
(74) *Attorney, Agent, or Firm* — Lee & Hayes, P.C.

(57) ABSTRACT

This disclosure describes techniques for scheduling workloads relating to data collection from network devices. The techniques may include weighting attributes that impact the data collection workload on computational, storage, and/or other resources of a data collector. The scheduling process may also include consideration of current usage rates at a data collector, to avoid overloading a particular collector while potentially underutilizing others. The weighting of attributes and/or consideration of usage rates may improve the efficiency of workload scheduling among a set of collectors. The overall result may include better utilization of the collectors and/or other resources of the computing network.

20 Claims, 10 Drawing Sheets

400

```
Cisco-IOS-XR-infra-statsd-oper:infra-statistics/interfaces/interface/latest/generic-counters Summary: GPB(common) Message [kafkaconsumer(RouterSanFrancisco#uuid=ed67ce0c-376c-4ae8-8c78-eca0c3e94716)/
Cisco-IOS-XR-infra-statsd-oper:infrastatistics/interfaces/interface/latest/generic-counters msg len: 12023]

{
"Source": "kafkaconsumer",
"Telemetry": {
"node_id_str": "RouterSanFrancisco",
"node_id_uuid": "7WfODDdsSuiMeOygw+IHFg==",
"subscription_id_str": "CW_1b4ac245d863cf3e787d42bae97f1d18dd300d5e",
"encoding_path": "Cisco-IOS-XR-infra-statsd-oper:infra-statistics/interfaces/interface/latest/generic-counters",
"collection_id": 86781,
"collection_start_time": 1567410733201,
"msg_timestamp": 1567410733201,
"data_gpbkv": [],
"data_gpb": null,
"collection_end_time": 1567410733238,
"collector_uuid": "bWR0LXJvYm90LWNvbGxlY3Rvci1mZjY0NzljNy1iZGQzLTQ0ZmYtOGE0NS1mYmQ1NTlmNzdiNjc=",
"status": null
},
"Rows": [
{
"Timestamp": 1567410733236,
"Keys": {
"interface-name": "GigabitEthernet0/0/0/0"
},
"Content": {
"broadcast-packets-sent": 2,
"throttled-packets-received": 0,
"input-errors": 0,
"input-overruns": 0,
"bytes-sent": 2200518270816,
"framing-errors-received": 0,
"carrier-transitions": 0,
"output-drops": 0,
"output-queue-drops": 0,
"input-drops": 0,
"last-data-time": 1567410722,
"bytes-received": 2064062483779,
"broadcast-packets-received": 1,
"output-buffers-swapped-out": 0,
"seconds-since-packet-received": 12,
"multicast-packets-received": 0,
"input-queue-drops": 0,
"input-aborts": 0,
"output-errors": 0,
"applique": 0,
"seconds-since-last-clear-counters": 0,
"runt-packets-received": 0,
"parity-packets-received": 0,
"unknown-protocol-packets-received": 0,
"crc-errors": 0,
"input-ignored-packets": 0,
"output-buffer-failures": 0,
"seconds-since-packet-sent": 12,
"packets-sent": 9817151656,
"multicast-packets-sent": 0,
"output-underruns": 0,
"last-discontinuity-time": 1558943272,
"packets-received": 9046263295,
"giant-packets-received": 0,
"resets": 0,
"availability-flag": 0
}
}
]
}
```

FIG. 4

WORKLOAD SCHEDULING FOR DATA COLLECTION

TECHNICAL FIELD

The present disclosure relates generally to monitoring network devices, and more specifically, to scheduling workloads for collecting data from network devices.

BACKGROUND

Network management applications may be employed to help manage a computing network. In the course of performing management operations, the applications may regularly utilize data collected from devices in the computing network. Data may be requested from a countless number of devices, by a countless number of applications. The data requests of each application may be disparate, and/or may be overlapping for same or similar data from the same devices. Moreover, different applications may each use data on a recurring basis but at different cadences, which may result in duplicated data retrieval. To orchestrate the potentially voluminous data collection workload, a centralized collection service utilizing multiple collectors may be used to manage data collection for the applications across a large number of devices of the computing network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIG. 4 illustrates an example sensor path related to workload scheduling for data collection among network devices, in accordance with the present concepts.

DESCRIPTION OF EXAMPLE EMBODIMENTS

Overview

Figure 1:
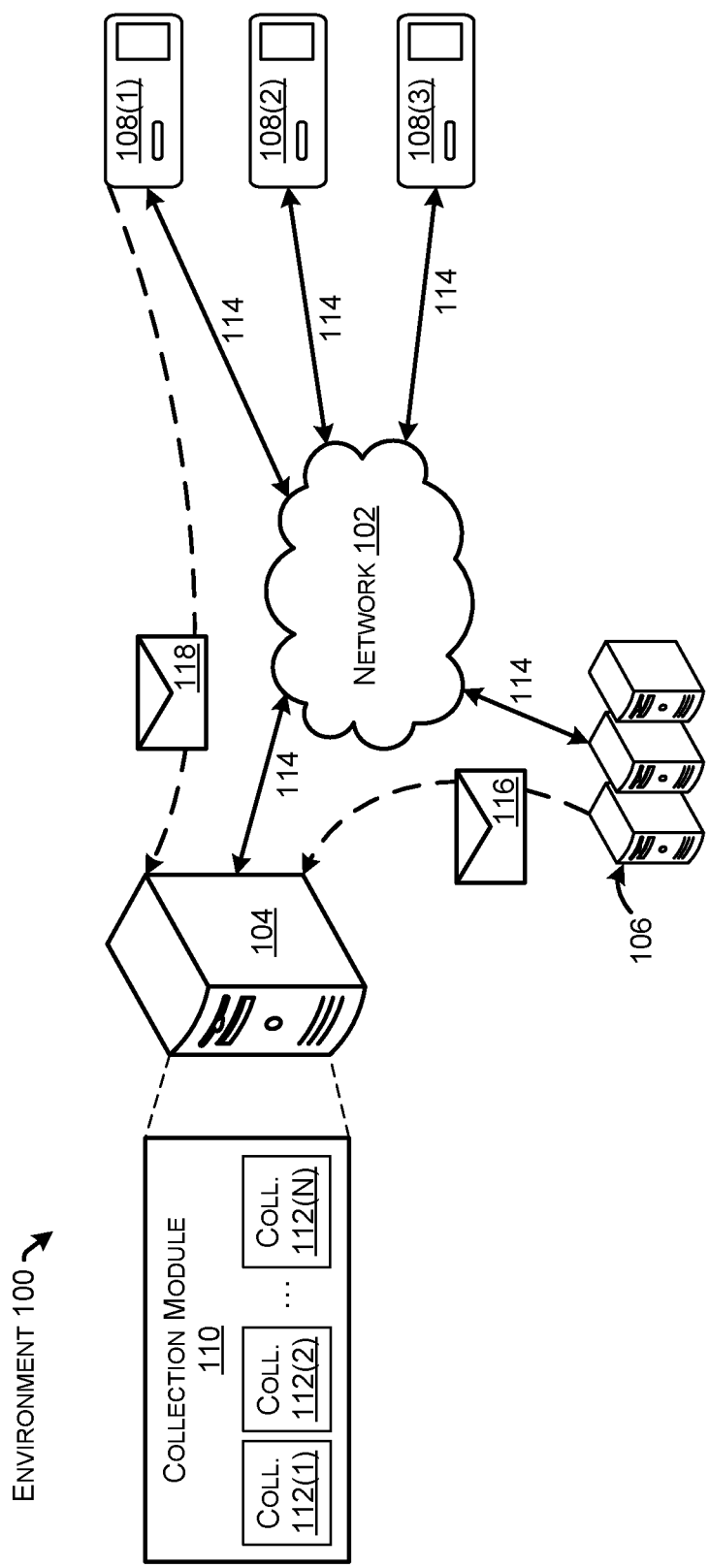
FIG. 1 illustrates a component diagram with an example environment in which workload scheduling for data collection may be employed, in accordance with the present concepts.

This disclosure describes, at least in part, a method that may be implemented by a server device communicatively coupled to network devices. The method may include obtaining a data collection request for data to be collected by a collector of a set of collectors. In some examples, the data may be collected from a network device of a computing network. The data collection request may include an indication of a sensor path from which the data are to be collected and a frequency at which the data are to be collected. The method may also include determining one or more attribute weights of the sensor path. The method may include calculating a total sensor path weight for the sensor path based at least in part on the one or more attribute weights, and calculating a sensor path usage rate for the sensor path based at least in part on the frequency and the total sensor path weight. Further, the method may include selecting the collector from the set of collectors based at least in part on a cumulative usage rate of the collector relative to cumulative usage rates of individual collectors of the set of collectors. In some instances, the method may include scheduling the data collection request with the collector.

This disclosure also describes, at least in part, another method that may be implemented by a server device communicatively coupled to network devices. The method may include receiving a data collection request for data collected from a sensor path associated with a network device. The method may include determining a sensor path weight of the sensor path based at least in part on at least one attribute of the sensor path, and determining a sensor path usage rate based at least in part on the sensor path weight and a frequency at which the data are to be collected. The frequency may be indicated in the data collection request, for example. In some instances, the method may include assigning the data collection request to a collector. The method may also include determining a cumulative collector usage rate for the collector. The cumulative collector usage rate may represent the sensor path usage rate of the data collection request and at least one additional sensor path usage rate of a previously assigned data collection request at the collector. The method may include receiving a subsequent data collection request. Further, the method may include assigning the subsequent data collection request to the collector based at least in part on comparing the cumulative collector usage rate of the collector with at least one other cumulative collector usage rate of another collector.

Additionally, the techniques described herein may be performed by a system and/or device having non-transitory computer-readable media storing computer-executable instructions that, when executed by one or more processors, performs the method described above.

Example Embodiments

This disclosure describes techniques for distributing workloads related to data collection from devices in computing networks. The data collection workloads may be distributed across a pool of data collectors in a manner that more efficiently utilizes the computational resources, storage resources, and/or throughput of each data collector. In some examples, a workload scheduling process may include weighting attributes that impact the data collection workload on the resources of a data collector. The scheduling process may also include consideration of current usage rates at any given collector, such as whether the collector is underloaded or overloaded compared to other collectors. The weighting of attributes and/or consideration of usage rates may improve the efficiency of workload scheduling among the set of collectors. The overall result may include better utilization of the collectors, the computing network, and/or other resources. Improvements in efficiency offered by the present techniques may allow a relatively small set of collectors to service a relatively large number of devices. Data collection workload scheduling techniques may also allow more fluid scaling of a collection layer of a computing network.

Applications may regularly request data associated with devices in a computing network. The applications may be associated with network management and/or operations. For example, the requested data may be telemetry data that are relevant for observing the operational status and/or performance of a network device (e.g., state data, data collected by sensors of the device, etc.). Data may initially be stored locally on network devices. In some cases, data may also be managed by a centralized collection service through which applications can request the data. In some implementations, a collection service may include a set of collectors that collect data for the applications. The collection service may receive data collection requests from the applications. The data collection requests may reference a sensor path from which the data are to be collected. The sensor path may correspond to a set of data that is collected from a given network device, as used herein. As the collection service receives the requests, the collection service may apply a scheduling process to service the requests in an efficient manner. For instance, the scheduling process may a be multi-stage process that organizes the incoming requests, assigns weights to requests according to attributes of the sensor paths, examines the changing usage rates (e.g., workloads) of the collectors, and/or schedules the data collection jobs at the collectors. As the requests are serviced by the collectors, the collection service may continue to monitor the overall data collection operation, fielding new data collection requests and scheduling collectors according to how busy individual collectors are with current data collection jobs.

A variety of attributes of any given data collection request may affect the resource impact the request has on a data collector. For example, the load on computing resources of a given collector may be affected by attributes such as a sensor path size attribute relating to a size or amount of data to be collected, a device attribute relating to configuration details of the network device associated with the sensor path, and/or a priority attribute related to a priority level of the sensor path. Also, a frequency (e.g., collection frequency, cadence) at which the data are collected may affect the resource impact the request has on a data collector. As such, efficient distribution of data collection jobs to collectors may be improved by weighting the data collection requests in light of the attributes, and/or by considering the collection frequency. Additionally, or alternatively, distribution of data collection jobs may be improved by examining current usage rates of computing resources of the collectors. For instance, a new data request may preferentially be assigned to a collector that has a relatively low current usage rate. Stated another way, efficient distribution of a new collection job may include assigning the new job to a less busy collector. Such deliberate and intelligent distribution of data collection jobs may lead to an overall improvement in the use of computing resources and/or throughput of individual collectors. The present techniques may also improve a service offered by the computing network, helping it to meet a service level agreement (SLA) for a high priority client, for instance. In contrast to the present techniques, less intelligent distribution methods may lead to suboptimal collector allocation. For example, a simple round-robin scheduling solution may lead to data collection overloading some collectors while underutilizing others. Similarly, statically binding a certain set of sensor paths and/or devices to a particular collector, without any consideration of attributes such as collection size or frequency, for example, may also lead to overloading some collectors while underutilizing others.

To summarize, a weighted method of considering incoming data collection requests may improve the scheduling of a data collection workload. Furthermore, consideration of the current usage rates of collector resources while distributing data collection jobs may significantly improve the efficiency of data collection operations. In some cases, the present techniques of data collection workload scheduling may improve the overall operations of a computing network in terms of resource utilization and/or service provided.

Although the examples described herein may refer to a central collection service/module, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present data collection workload scheduling concepts. Example environment 100 may include computing network 102 (e.g., network), a server device 104 (e.g., server, telemetry server), one or more application devices 106, and/or network devices 108. Server device 104 may include a collection module 110, which may include a set of collectors 112. In some cases, parentheticals are utilized after a reference number to distinguish like elements. For example, the set of collectors 112 includes collector 112(1), collector 112(2), and collector 112(N), where the "N" may represent an unspecified number of total collectors 112. Use of the reference number without the associated parenthetical is generic to the element. The numbers and/or types of devices shown in this example are not meant to be limiting. Although a cloud computing network is suggested in FIG. 1, other types of networks are contemplated in accordance with data collection workload scheduling concepts.

Server device 104 may be communicatively coupled to various other devices, such as application devices 106 and/or network devices 108, via computing network 102. Within the example environment 100, the server device 104, application devices 106, network devices 108, and/or other devices may exchange communications (e.g., packets) via a network connection(s) to cloud computing network 102, indicated by double arrows 114. For instance, network connections 114 may be transport control protocol (TCP) network connections or any network connection (e.g., information-centric networking (ICN)) that enables the server device 104 to exchange packets with other devices via computing network 102. The network connections 114 represent, for example, data paths between the server device 104 and application devices 106. It should be appreciated that the term "network connection" may also be referred to as a "network path." As used herein, a server device, application device, and/or network device may be a computer, router, node, border device, gateway device, laptop, mobile device, tablet, etc.

In some implementations, an application device 106 may send a data collection request 116 to the data collection module 110. The data collection request 116 is shown with a dashed line indicating the request is coming from one of the application devices 106 to the data collection module 110. In other examples, a network management application requesting data may reside on a device that also includes a data collection module. Referring again to FIG. 1, the data collection request 116 may relate to a sensor path 118 indicating data to be collected from a particular network device 108. The sensor path 118 is shown with a dashed line indicating data collection from network device 108(1). The network device 108 may or may not be a producer, a point of generation, and/or an originator of the data. For instance, the data may originate elsewhere for the network device 108 to be able to provide to the server device. Alternatively or additionally, the data may pass through other network devices (e.g., router, switch) on a path from the network device 108 to the server device 104. The data collection module 110 may process the request 116, and/or may schedule a data collector 112 to service the request 116 utilizing sensor path 118. In some cases, the data collection module 110 may process the request 116 by performing a scheduling process.

Figure 2:
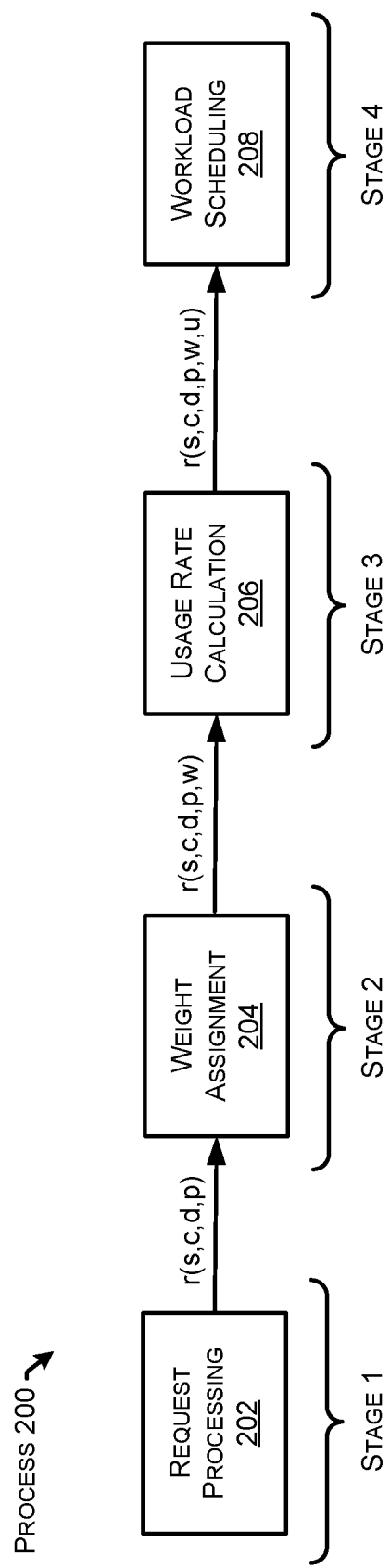
FIG. 2 illustrates an example process related to workload scheduling for data collection among network devices, in accordance with the present concepts.

FIG. 2 illustrates an example scheduling process 200 in accordance with the present data collection workload scheduling concepts. In some implementations, scheduling process 200 may be performed by a data collection service at a server (e.g., data collection module 110 described relative to FIG. 1). In the example shown in FIG. 2, the scheduling process 200 may include various steps, including request processing 202, weight assignment 204, usage rate calculation 206, and/or workload scheduling 208. The steps of scheduling process 200 may be viewed as comprising multiple stages of a workload scheduling pipeline. In FIG. 2, the steps correspond to four stages of the pipeline. In some implementations, request processing 202, or Stage 1, may be viewed as compiling requests, and potentially reducing and/or optimizing requests, in preparation for the subsequent Stages. In this view, Stages 2-4 of scheduling process 200 may be considered a weighted workload scheduling algorithm for handling the compiled and/or potentially optimized requests that are produced in Stage 1. The numbers and/or division of the steps in the workload scheduling process shown in this example are not meant to be limiting. Other examples may include more or less steps and/or stages, and/or some aspects of the workload scheduling process may be ordered differently.

As shown in FIG. 2, Stage 1 of example scheduling process 200 corresponds to request processing 202. Stage 1 may correspond to the data collection service receiving various data collection requests from network management applications, and organizing the requests into efficient groupings. In some examples, requests may be grouped and/or reduced in a way that use of collector resources is minimized while the requests are satisfied. For instance, the collection service may be aware of similarities of different parts of data that are requested by applications, as well as the frequency at which applications repeat their requests for data. When multiple applications submit requests for data, the collection service may track the different paths (e.g., sensor paths) of the requested data along with the respective cadences across many applications. The collection service may build a simple network management protocol (SNMP), prefix-based tree of management information base (MIB) descriptions of network objects, one or more yet another next generation (YANG) data tables, and/or a min-heap of different cadences of sensor paths across applications per device. In the YANG model, data may be stored in leaf nodes of a YANG tree. Data in a particular node may be specified according to the respective YANG path. In some cases, a common prefix parent (e.g., node in a tree) may be identified across different portions of data. Data may then be retrieved at a parent node once, rather than performing multiple requests for data from different leaves (e.g., child nodes) of telemetry data at a device. Moreover, the data collection service may utilize the min-heap to determine a minimum viable cadence across all applications requesting data from a network device, and may thus collect from sensor paths at a cadence that satisfies the service level agreements of multiple applications. At the end of Stage 1, a request may be generated consisting of a (potentially) optimized sensor path and/or cadence.

In FIG. 2, the request produced by Stage 1 is represented as "r(s,c,d,p)," corresponding to a request (r) with properties sensor path (s), cadence (c), device, (d) and priority (p). This request passes to weight assignment 204, or Stage 2, of the example scheduling process 200. In general, data collectors may have use of uniform resources from a cluster resource allocator (e.g., Kubernetes) in terms of central processing unit (CPU), memory, and/or network resources, for instance. A collector may be responsible for a collection job comprised of collecting a sensor path at a specified cadence from a given data source (e.g., network device). A sensor path may represent a set of data (e.g., SNMP MIB, YANG) that is collected from a given network device. The impact of a specified sensor path on overall data collection efficiency may differ based on attributes and/or properties of the sensor path, such as a size of collection, frequency of collection (e.g., cadence), and/or associated configurations on a given device. Some of these attributes will be described in more detail below, relative to FIGS. 3A-3F. Also, an example sensor path is shown in FIG. 4 and described below. Referring again to example scheduling process 200 in FIG. 2, precomputed weights for certain attributes may be assigned to a sensor path by the data collection service in Stage 2. The precomputed weights based on known attributes may then be used to calculate a sensor path weight (e.g., total sensor path weight). An example equation for calculating a sensor path weight is:

$$w_i = \Sigma_{k=1}^{n} a\_w_{ki}$$

where $w_i$ is the sensor path weight, n is the number of attributes, and $a\_w_{ki}$ represents the weight for a given attribute. In other examples, the attribute weights may be normalized before summing. In example scheduling process 200, the sensor path weight is the product of weight assignment 204, indicated as "w" in the updated request that is produced by Stage 2 and moves on to Stage 3.

Referring to Stage 3 in example scheduling process 200, the sensor path weight produced in Stage 2 may be used along with a frequency of the sensor path to calculate a virtual metric referred to as the sensor path usage rate. In this example, the sensor path usage rate "u" may be expressed as a weight per millisecond. A higher usage rate may indicate a larger impact on collection resources, whereas a smaller usage rate may indicate a lesser impact on collection resources. Stated another way, a higher usage rate for any given sensor path may correspond to a busier collector while servicing that sensor path. An example equation for calculating a sensor path usage rate is:

$$u_i = \frac{w_i}{f_i}$$

where $u_i$ is the sensor path usage rate, $w_i$ is the sensor path weight (produced in Stage 2), and $f_i$ is the sensor path cadence. As noted above, in some cases, normalization and/or another mathematical operation may be applied to some aspect of the sensor path weight prior to applying the sensor path cadence.

In some examples, the data collection service may track and/or maintain a cumulative collector usage rate for individual collectors. The cumulative collector usage rate may be compiled from the collection jobs currently assigned to a given collector. For example, an example equation for calculating a cumulative collector usage rate is:

$$c_n = \sum_{i=1}^{k} u_i$$

where $c_n$ is the cumulative collector usage rate, n refers to an individual collector, $k_i$ is the number of data collection jobs assigned to the collector "n," and $u_i$ is the sensor path usage rate (produced above) for any given sensor path.

In Stage 4 of example scheduling process 200, the collection service may compare cumulative collector usage rates for individual collectors as part of workload scheduling 208. For instance, the collection service may assign a new request to a collector that has a low, or the lowest, cumulative collector usage rate. The collection service may also re-evaluate any overlapping requests already assigned and/or may cancel obsolete requests at any given collector. To summarize scheduling process 200, the collection service may continually receive new data collection requests from request processing 202, and dynamically adjust the distribution of data collection jobs to a given set of collectors based on current workloads at individual collectors of the set. The collection service is able to efficiently schedule new data collection jobs based on calculating weighted, cumulative usage rates for the individual collectors using example scheduling process 200. Stages 2-4 of example scheduling process 200 will now be described in more detail relative to FIGS. 3A-3F.

FIGS. 3A-3F collectively illustrate an example data collection workload scheduling scenario 300. Example scenario 300 includes sets of conditions 302 at successive times of the scenario 300. Six times (T1-T6) are depicted, one in each of FIGS. 3A-3F. Scenario 300 may be viewed as an example of a data collection service performing a workload scheduling process (e.g., scheduling process 200) relative to a computing network (e.g., network 102). Referring to time T1 depicted in FIG. 3A, conditions 302(1) of scenario 300 may include a predefined attribute weight table 304, a predefined priority weight table 306, and a collector usage rate table 308(1), in this case.

Figure 3A:
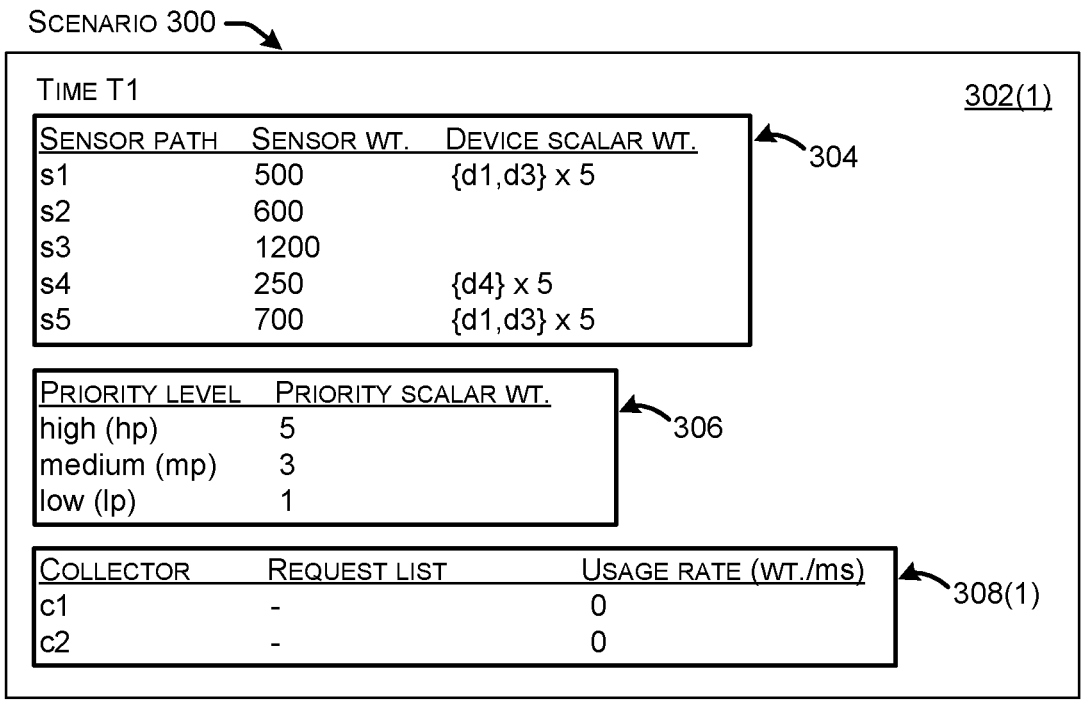
FIG. 3A-3F illustrate example sets of conditions that may occur relative to workload scheduling for data collection among network devices, in accordance with the present concepts.

In some implementations, certain attributes of sensor paths (e.g., sensor path 118) may have predefined and/or precomputed static weights. The predefined static weights may be used to determine an overall sensor path weight for any given sensor path, similar to Stage 2 of process 200 (see FIG. 2). In scenario 300, the attributes with predefined weights include a sensor size attribute corresponding to a data collection size, a device attribute corresponding to a device configuration, and a priority attribute corresponding to a priority of the sensor path. In FIG. 3A, sensor size attribute weights and device attribute weights for sensor paths s1-s5 are shown in predefined attribute weight table 304, while priority attribute weights for the priority levels high, medium, and low are shown in predefined priority attribute weight table 306. Predefined attribute weight table 304 includes three columns, the first of which identifies five sensor paths (s1-s5). The second column in table 304 lists the predefined values for sensor size attribute weights corresponding to the sensor paths. For instance, sensor path s1 is assigned a size attribute weight of 500. The third column lists values for device attribute weights. In predefined attribute weight table 304, not all sensor paths have a predefined device attribute weight. For example, sensor path s1 has a predefined device attribute weight of scalar value 5 in instances where s1 is collecting from network device 1 or network device 3. In contrast, sensor path s2 has no corresponding predefined device attribute weight. By default, the device attribute weight scalar value may simply be "1." In predefined priority attribute weight table 306, scalar values are provided for the different priority levels of sensor paths. Note that the sensor size attributes, device attributes, and priority attributes described relative to scenario 300 are merely provided for illustration purposes. In some examples, sensor size attribute, device attribute, and priority attribute may be considered primary attributes that impact a collection workload. In other scenarios, more, less, or alternative attributes may be considered for a predefined weight, may be used to determine an overall sensor path weight, and/or may be used to calculate a collector usage rate. Additional detail will now be provided for the example attributes of sensor size, device, and priority.

The sensor size attribute may correspond to a collection size of the sensor path. The collection size may be measured as a number of bytes collected (e.g., byte collection size) for a given sensor path. A larger collection size may correspond to more impact on a workload of a given collector with regards to computational resources. The sensor size attribute weight assigned may be the number of bytes as statically defined for a given sensor path. For instance, a sample output may be taken from a sensor path, and an output data size may be calculated for one row of the content of the sample output. Alternatively, variable data sizes of an object payload for a sensor path may be summed and/or averaged to find a number of bytes. In one instance, a sensor size attribute weight may have a value of 1560 bytes. In some examples, the remaining attribute weights (e.g., device attribute weight, priority attribute weight) may be scalars that are applied to the sensor size attribute weight. Values related to the sensor size attribute weight, the device attribute weight, and/or the priority attribute weight may be included in a data collection request from an application, or may be determined by the collection service, such as in Stage 1 of process 200 (see FIG. 2).

The device attribute weight may be related to a configuration of a network device, as the configuration relates to a sensor path. For example, some network devices (e.g., aggregation devices) may have a relatively large amount of interfaces configured. A higher amount of interfaces may correlate to a higher collection throughput for a related sensor path, and therefore may lead to a higher usage rate at a collector. Thus, a higher device attribute weight may be assigned to interface-related sensor paths associated with aggregation devices. For example, consider a first device configured with 48 active gigabit ethernet ports and a second device that has only 12 active gigabit ethernet ports. For the instance of a sensor size attribute weight of 1560 bytes introduced above, the device attribute weight may be determined by multiplying the sensor size attribute weight by the number of collections at any given network device. The resultant value for the first device may be 74880, while a value for the second device may be 18720. However, rather than using these raw values, an approximation with a scalar multiplier may be used to define how strongly a device role and/or configuration relates to a sensor path. Stated another way, the scalar multiplier may present a relative difference in the usage rate impact of different device configurations. As such, the scalar multiplier may be defined within a range, such as 1 to 5, where 5 represents a strong relationship with regards to the sensor path and the device configuration, whereas 1 represents a relationship that is less impactful on a usage rate. In this instance, the first device may be assigned a device weight of 5, while the second device is not assigned a particular device weight. For devices not assigned a particular device weight, a default value of 1 may be used, in some cases. Thus, 1 is used as a device weight for the second device in this example.

The priority attribute weight may be associated with a priority and/or quality of service (QOS) associated with the sensor path. For example, a higher priority associated with a sensor path may correspond to greater impact on the associated collection workload. In some examples, a priority attribute weight may be assigned as a scalar multiplier value based on a priority level. For instance, priority levels may include high priority (hp), medium priority (mp), and low priority (lp). An indication of a priority level may be passed from an application to the collection service along with or within a data collection request. Further, classes and/or quality of service may be defined across the sensor paths as mapping to one of the priority levels. Therefore, an "hp" classified sensor path may be assigned a higher scalar weight than an "mp" or "lp" classified sensor path. The higher weight may indicate that all other attributes being equal, the priority attribute will have more impact on the workload collection with regards to computational resources. Furthermore, given two requests for different applications for a same sensor, a request with a higher priority attribute weight may be preferentially scheduled over a request with a lower priority attribute weight. In other examples, a range of values may be established for each priority level, where a higher range of values may be used for higher priority levels. In yet another example, collectors may be divided into priority pools corresponding to the priority levels, where data collection requests may be divided based on priority level, and directed to the pooled collectors for the matching priority level.

Figure 3B:
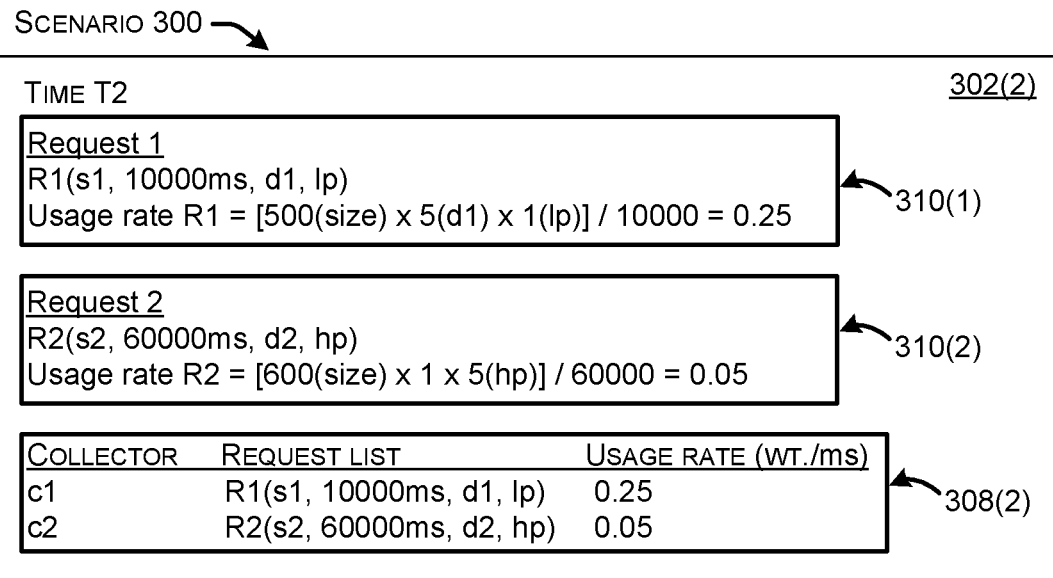

Referring again to FIG. 3A, the collector usage rate table 308(1) lists two collectors (c1, c2). Since FIG. 3A represents a starting point of scenario 300, no requests have been assigned to either collector, therefore the respective usage rates of collectors c1 and c2 at time T1 are zero (no usage). The collection service may maintain and/or update the collector usage rate table 308 with current usage rates of individual collectors as time proceeds. As shown in FIG. 3B, scenario 300 may proceed with receiving a first data collection request 310(1) and a second data collection request 310(2) at time T2. The data collection requests 310 may have been produced by Stage 1 of a scheduling process, similar to the request denoted as "r(s,c,d,p)" with properties "sensor path," "cadence," "device," and "priority" produced in Stage 1 of process 200 (see FIG. 2). Accordingly, as shown in FIG. 3B, request 310(1) corresponds to sensor path s1, a cadence (e.g., frequency) of 10000 milliseconds (ms), network device d1, and a low priority (lp). Request 310(2) corresponds to sensor path s2, a cadence of 60000 milliseconds (ms), network device d2, and a high priority (hp).

For the first request 310(1) and the second request 310(2), sensor path usage rates may be calculated using the example equation(s) described above relative to usage rate calculation 206 in FIG. 2. In FIG. 3B relative to request 310(1), the sensor size attribute weight of 500 (size for sensor path s1) and the device attribute weight, a scalar value of 5 (for network device d1), are drawn from predefined attribute weight table 304 (FIG. 3A). Similarly, the priority weight, a scalar value of 1, is drawn from predefined priority attribute weight table 306 (FIG. 3A). Note that the usage rate calculation factors the cadence (e.g., collection frequency) into the workload, in this instance. The sensor path usage rate may be calculated by dividing the sensor path weight (e.g., total sensor path weight) by the cadence value. Effectively this may produce a number of device sensor priority bytes per millisecond, which accounts for the sensor path size, a relationship to the device configuration, the priority of the sensor path, and the cadence. As a result, a larger usage rate may indicate the specified sensor path has a relatively significant impact on data collection, whereas a smaller usage rate value may indicate a lesser impact. In FIG. 3B, the resulting usage rate for first request 310(1) is 0.25, expressed as a weight per millisecond. The usage rate for second request 310(2) is 0.05. The conditions 302(2) of time T2 also include collector usage rate table 308(2), which shows first request 310(1) assigned to collector c1 and second request 310(2) assigned to collector c2. In this example, since both collectors c1 and c2 had zero cumulative usage at the start of time T2, the first and second requests may be assigned randomly to collectors c1 and c2. At the conclusion of time T2, collector c1 has a higher usage rate (0.25) than that of collector c2 (0.05). Stated another way, collector c1 is busier than collector c2.

Figure 3C:
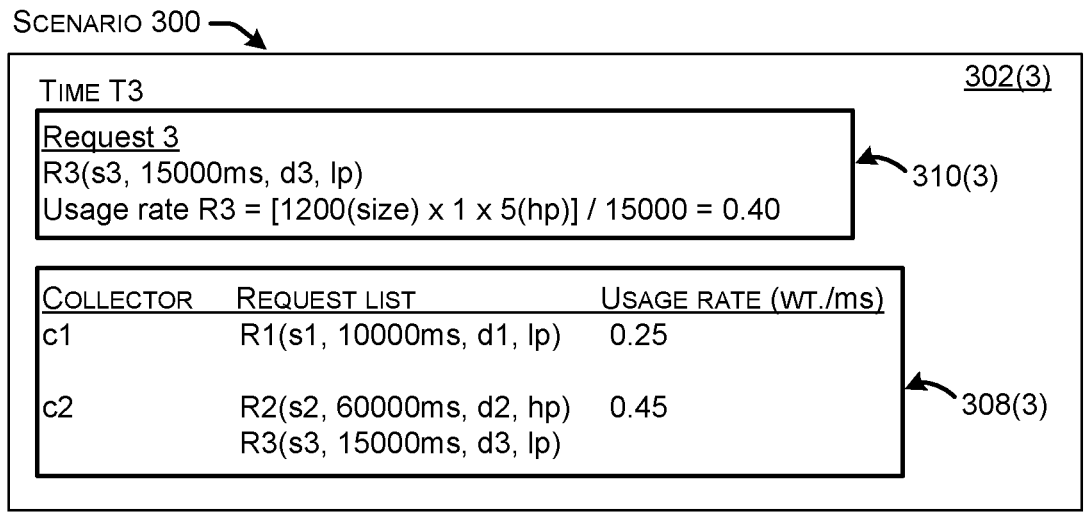

Proceeding with time T3 shown in FIG. 3C, a third data collection request 310(3) may be received by the data collection service from an application. For sake of simplicity in example scenario 300, only two collectors (c1, c2) are considered for the collector pool utilized by the data collection service. (In other examples, the collector pool may be larger.) Although both collectors are in use at the conclusion of time T2, the third request 310(3) may be assigned to one of the two busy collectors, since no other collectors are available in this example. Since collector c2 had a lower cumulative collector usage rate at the end of time T2, or was less busy than collector c1, the third request 310(3) may be assigned to collector c2. The sensor path usage rate calculation for the third request 310(3) results in a usage rate of of 0.40. The collection service may post the allocation of the third request 310(3) to collector c2 in collector usage rate table 308(3). At the conclusion of time T3, the cumulative collector usage rate for collector c2 is now 0.45, since collector c2 is servicing the second request 310(2) at 0.05 plus the third request 310(3) at 0.40. In other words, the collection service may update the collector usage rate table 308 with a cumulative collector usage rate for any given collector by summing the sensor path usage rates of the respective requests the collector is currently servicing.

In some implementations, the collection service may review incoming requests 310 to determine whether a new request overlaps any existing collection job already allocated to a collector. Any overlapping previous collection job may be unscheduled from the respective collector. The cumulative collector usage rate of that collector may then be re-calculated before the new request 310 is assigned to a collector. The collection service may then select the collector with the updated lowest collector usage rate to keep the workload balanced across the collectors. Note in time T3 of scenario 300, the third request 310(3) did not overlap with an existing collection job being performed by a collector. The third request 310(3) was relevant to sensor path s3 and network device d3 (s3,d3). However, the existing collection jobs at the start of time T3 were relevant to (s1,d1) and (s2,d2), indicating no overlap in either a sensor path or network device designation.

Figure 3D:
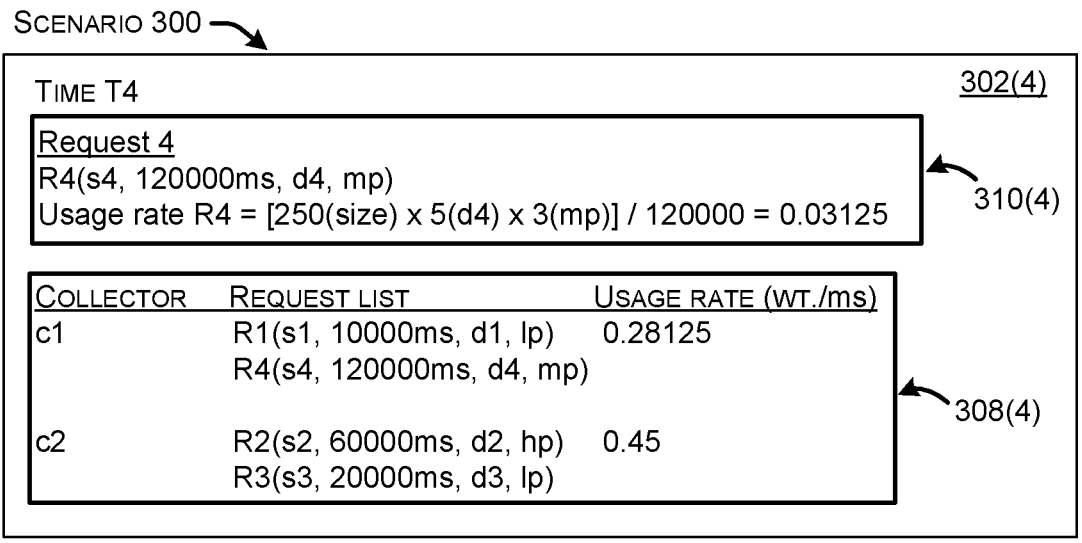

In FIG. 3D, scenario 300 may proceed with time T4 and the receipt of a fourth data collection request 310(4) by the collection service. Request 310(4) is relevant to sensor path s4 and network device d4, suggesting no overlap to existing collection jobs. Therefore, request 310(4) may be assigned to collector c1, which has a lower cumulative collector usage rate. The collection service may update collector usage rate table 308(4) accordingly.

Figure 3E:
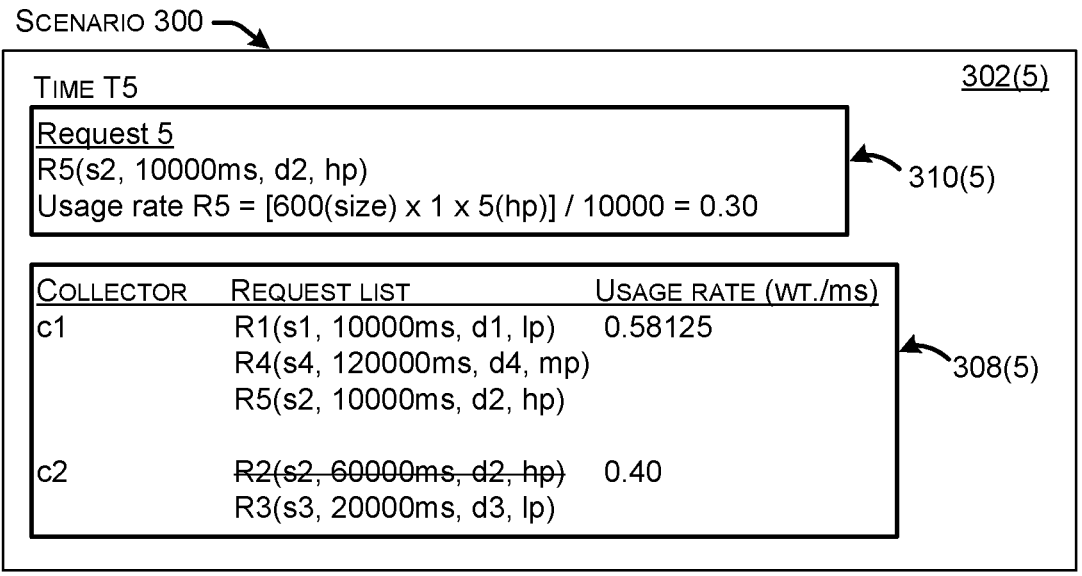

In FIG. 3E, a fifth data collection request 310(5) may be received by the collection service. In this instance, the collection service may recognize that request 310(5) overlaps (e.g., collides, interferes) with an existing collection job. Request 310(5) is relevant to sensor path s2 and network device d2. However, as shown in the collector usage rate table 308(4) at the end of time T4, request 310(2) is currently being serviced by collector c2. Since request 310(2) is relevant to sensor path s2 and network device d2, request 310(2) and request 310(5) overlap. Also, the cadences of request 310(2) and request 310(5) are different. Request 310(5) has a higher frequency cadence (10000 ms) than the cadence of request 310(2), which is 60000 ms. In this case, the collection service may recognize that request 310(5) may need to be assigned to a collector in order to fulfill the data collection request at the higher frequency cadence. By servicing request 310(5), the needs of request 310(2) will also be met, since data will still be collected via sensor path s2 from network device d2. Therefore, the collection service may un-schedule (e.g., remove, delete) request 310(2) from the current workload of collector c2. The un-scheduling of request 310(2) is represented with strikethrough of request 310(2) in collector usage rate table 308(5). Also in collector usage rate table 308(5), the cumulative collector usage rate of collector c2 is adjusted to 0.40, reflecting the sensor path usage rate of only request 310(3). Prior to assignment of request 310(5) to a collector, the cumulative collector usage rates of the collectors are 0.28125 for collector c1 (at the end of time T4), and 0.40 for collector c2 (after the un-scheduling of request 310(2)). At this point, collector c1 has the lower cumulative collector usage rate, thus the collection service may assign request 310(5) to collector c1. The collection service may update collector usage rate table 308(5) accordingly.

Figure 3F:
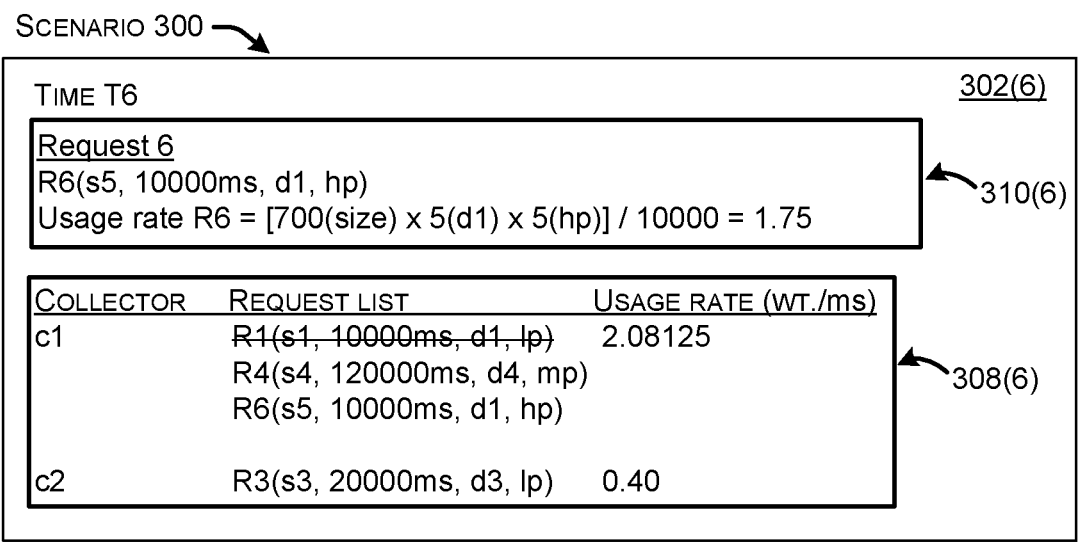

In FIG. 3F, a sixth data collection request 310(6) may be received by the collection service. In this instance, the collection service may recognize that request 310(6) interferes with request 310(1). Although request 310(1) pertains to sensor path s1 while request 310(6) pertains to sensor path s5, both requests are collecting from the same network device d1 at the same cadence. Also, request 310(6) is assigned a high priority level, while request 310(1) has a low priority level. Therefore, the collection service may determine that request 310(1) is to be un-scheduled in favor of servicing the higher priority data request 310(6) for network device d1. Accordingly, the un-scheduling of request 310(1) is represented with strikethrough of request 310(1) in collector usage rate table 308(6). The cumulative collector usage rate of collector c1 after the un-scheduling of request 310(1) would be 0.33125 (not shown), which is lower than the cumulative collector usage rate of collector c2 at 0.40. At this point, since collector c1 has the lower cumulative collector usage rate, the collection service may assign request 310(6) to collector c1. The collection service may update collector usage rate table 308(5) accordingly, with a new cumulative collector usage rate for collector c1 of 2.08125.

In some cases, a first sensor path may be considered a subset of a second sensor path, such that if the second sensor path is collected, the first sensor path will also be collected. For example, in scenario 300, sensor path s1 may be viewed as a subset of sensor path s5. In this example, sensor path s1 may be limited to a particular type of data to be collected from network device d1. For instance, sensor path s1 may relate only to interface data of network device d1. Meanwhile, sensor path s5 may relate to a broader collection of data that includes the interface data associated with sensor path s1, plus other types of data to be collected from network device d1. In some examples, request processing 202 of example scheduling process 200 (see FIG. 2) may resolve such issues by compiling data collection requests to account for overlaps before the requests proceed to Stages 2-4. However, as illustrated by the example of FIG. 3F, the collection service may have the capability to resolve overlaps within Stages 2-4 by un-scheduling conflicting requests when overlaps arise dynamically as new requests are received over time. Thus, the collection service may be able to resolve conflicts without necessarily performing request processing 202, or Stage 1, of scheduling process 200. As such, Stages 2-4 of the scheduling process 200 may represent a self-contained process that includes many tools for the collection service to efficiently schedule workloads related to data collection.

The example request assignments shown in FIGS. 3A-3F are provided to illustrate many ways that a collection service may proceed in any given workload scheduling scenario by dynamically adjusting the distribution of data collection jobs to a given set of collectors. In these examples, the collection service was able to schedule new data collection jobs based on calculating weighted, cumulative collector usage rates for the individual collectors. As such, data collection workload scheduling concepts may present an efficient way to distribute collection jobs among collectors, improving the capacity of a pool of collectors. The concepts illustrated in FIGS. 3A-3F may be contemplated for application in a wide variety of workload scheduling scenarios.

FIG. 4 illustrates an example sensor path 400 in accordance with the present concepts. Example sensor path 400 may be a YANG sensor path. Example sensor path 400 is provided simply for illustration purposes, to show additional detail regarding data collection workload scheduling concepts.

To summarize, the data collection workload scheduling techniques described herein may result in efficient distribution of data collection jobs among a set of collectors and/or better servicing of clients by a network. The weighting of attributes and/or consideration of collector usage rates in the scheduling process may improve the use of computing resources and/or throughput of individual collectors. Such improvements may allow a relatively small set of collectors to service a relatively large number of devices, and may allow greater scaling of a collection layer of a computing network. The overall result may include better utilization and/or operation of the collectors, the computing network, and/or other relevant resources.

Figure 5:
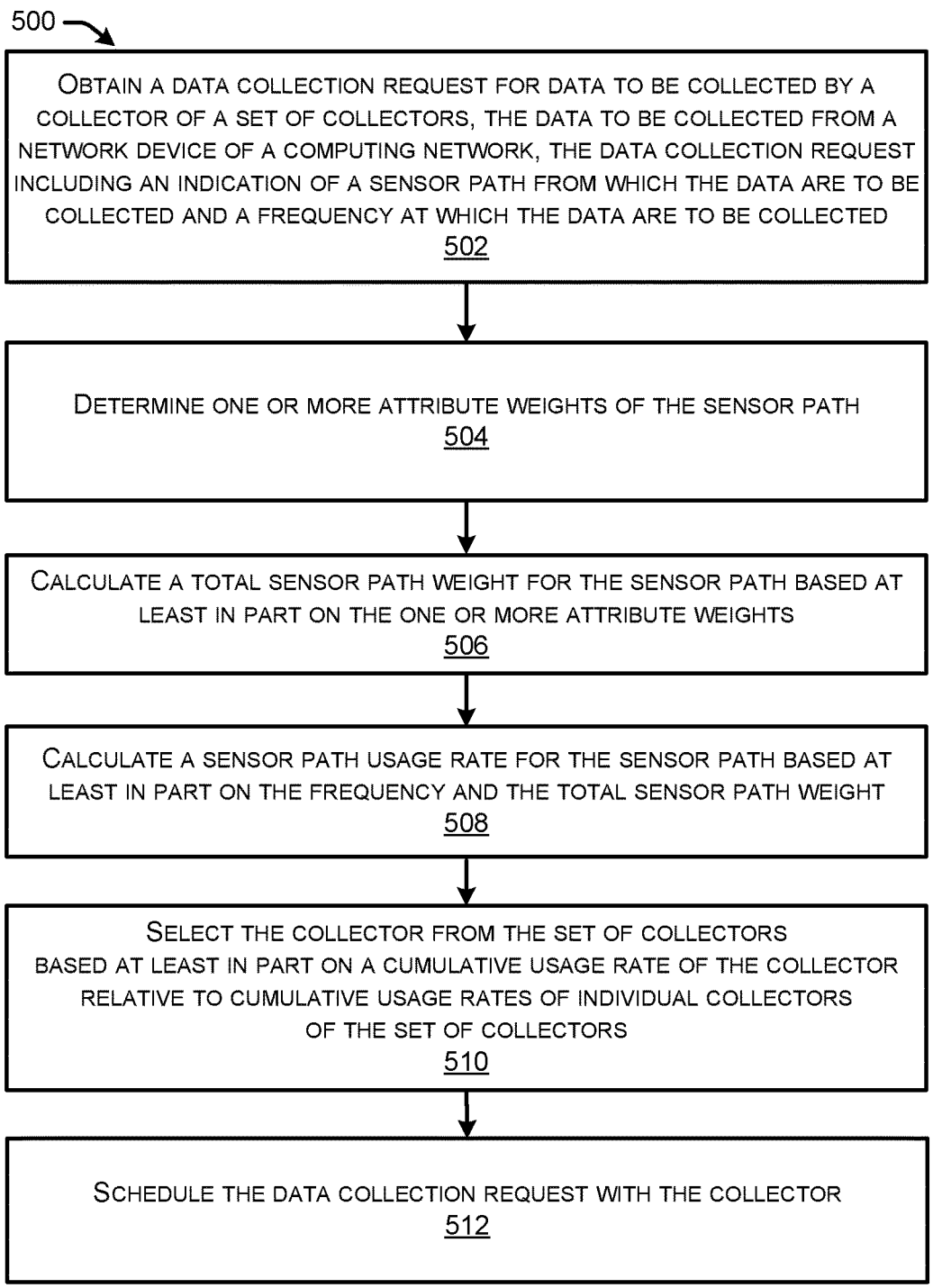
FIGS. 5 and 6 illustrate flow diagrams of example methods for workload scheduling for data collection among network devices, in accordance with the present concepts.
Figure 6:
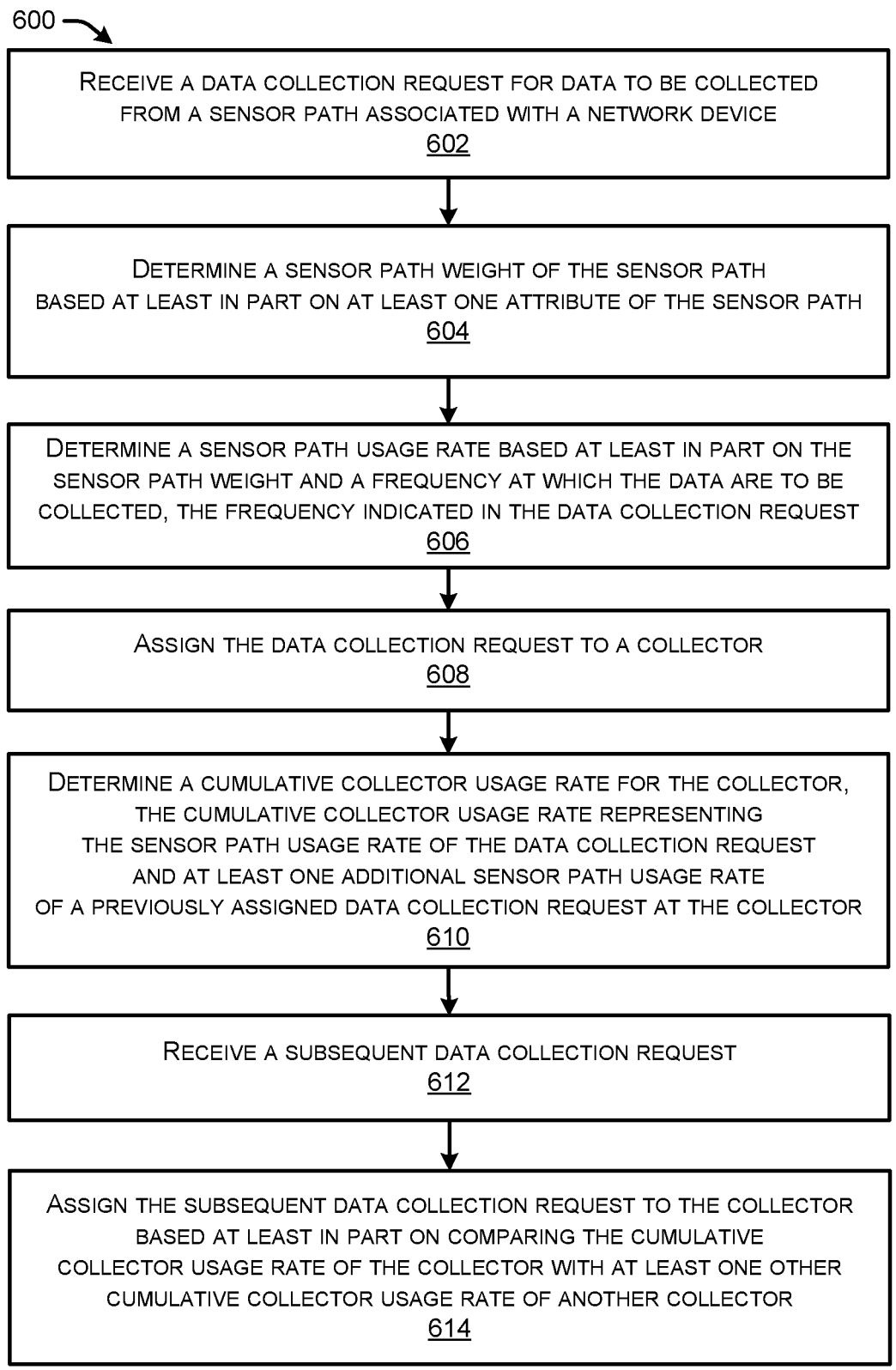

FIGS. 5 and 6 illustrate flow diagrams of example methods 500 and 600 that include functions that may be performed at least partly by a server device, such as server device 104 and/or collection module 110 described relative to FIG. 1. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 5 and 6 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 5 illustrates a flow diagram of an example method 500 for network devices to perform data collection workload scheduling techniques. Method 500 may be performed by a server device (e.g., server device 104) communicatively coupled to application devices (e.g., application devices 106) and/or network devices (e.g., network devices 108), for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include obtaining a data collection request. The data collection request may refer to data to be collected by a collector of a set of collectors. The data collection request may refer to data to be collected from a network device of a computing network, for instance. Further, the data collection request may include an indication of a sensor path from which the data are to be collected, and/or an indication of a frequency (e.g., cadence) at which the data are to be collected. In yet other examples, the data collection request may include an indication of a priority associated with the sensor path. In some examples, the data collection request may correspond to a "yet another next generation" (YANG) sensor path.

At 504, method 500 may include determining one or more attribute weights of the sensor path. In some examples, the one or more attribute weights may include a sensor size attribute weight corresponding to an amount of the data collected from the sensor path. The amount of the data may be represented as a byte collection size of the sensor path, for instance. In other examples, the one or more attribute weights may include a device attribute weight corresponding to a configuration of the network device. In yet other examples, the one or more attribute weights may include a priority attribute weight corresponding to a priority level of the sensor path.

At 506, method 500 may include calculating a total sensor path weight for the sensor path based at least in part on the one or more attribute weights. In some examples, the device attribute weight may be represented as a scalar value, and the total sensor path weight may be calculated by applying the scalar value of the device attribute weight to the sensor size attribute weight. Similarly, the priority attribute weight may be represented as a scalar value, which may be used to calculate the total sensor path weight.

At 508, method 500 may include calculating a sensor path usage rate for the sensor path based at least in part on the frequency and the total sensor path weight. For instance, the total sensor path weight may be divided by the frequency.

At 510, method 500 may include selecting the collector from the set of collectors. The collector may be selected based at least in part on a cumulative usage rate of the collector relative to cumulative usage rates of individual collectors of the set, for example. In some examples, the cumulative usage rate of the collector may comprise a sum of sensor path usage rates related to previous data collection requests assigned to the collector.

At 512, method 500 may include scheduling the data collection request with the collector. In some implementations, method 500 may include obtaining a subsequent data collection request. Method 500 may include determining that the subsequent data collection request interferes with a currently scheduled data collection request at the collector. The currently scheduled data collection request may be un-scheduled at the collector, in some cases. Method 500 may include updating the cumulative usage rate of the collector to reflect the un-scheduling of the currently scheduled data collection request. Further, method 500 may include scheduling the subsequent data collection request with the collector.

FIG. 6 illustrates a flow diagram of an example method 600 for network devices to perform data collection workload scheduling techniques. Method 600 may be performed by a server device (e.g., server device 104) communicatively coupled to application devices (e.g., application devices 106) and/or network devices (e.g., network devices 108), for instance. In some examples, method 600 may be performed by a computing device comprising one or more processors and one or more non-transitory computer-readable media storing computer-executable instructions that, when executed by the one or more processors, cause the one or more processors to perform method 600.

At 602, method 600 may include receiving a data collection request for data to be collected from a sensor path associated with a network device.

At 604, method 600 may include determining a sensor path weight of the sensor path. The sensor path weight may be determined based at least in part on at least one attribute of the sensor path. In some examples, the attribute may be a sensor size attribute, a device attribute, and/or a priority attribute of the sensor path.

At 606, method 600 may include determining a sensor path usage rate based at least in part on the sensor path weight. The sensor path usage rate may also be determined based at least in part on a frequency at which the data are to be collected. The frequency may be indicated in the data collection request, for instance.

At 608, method 600 may include assigning the data collection request to a collector.

At 610, method 600 may include determining a cumulative collector usage rate for the collector. The cumulative collector usage rate may represent the sensor path usage rate of the data collection request, for instance. The sensor path usage rate may also represent at least one additional sensor path usage rate of a previously assigned data collection request at the collector.

At 612, method 600 may include receiving a subsequent data collection request.

At 614, method 600 may include assigning the subsequent data collection request to the collector. The subsequent data collection request may be assigned based at least in part on comparing the cumulative collector usage rate of the collector with at least one other cumulative collector usage rate of another collector. For instance, the subsequent data collection request may be assigned to the collector based on the cumulative collector usage rate of the collector being lower than the at least one other cumulative collector usage rate. In some examples, the collector may be part of a collector pool, and the cumulative collector usage rate of the collector may be lower than the cumulative collector usage rates of other collectors in the collector pool.

Figure 7:
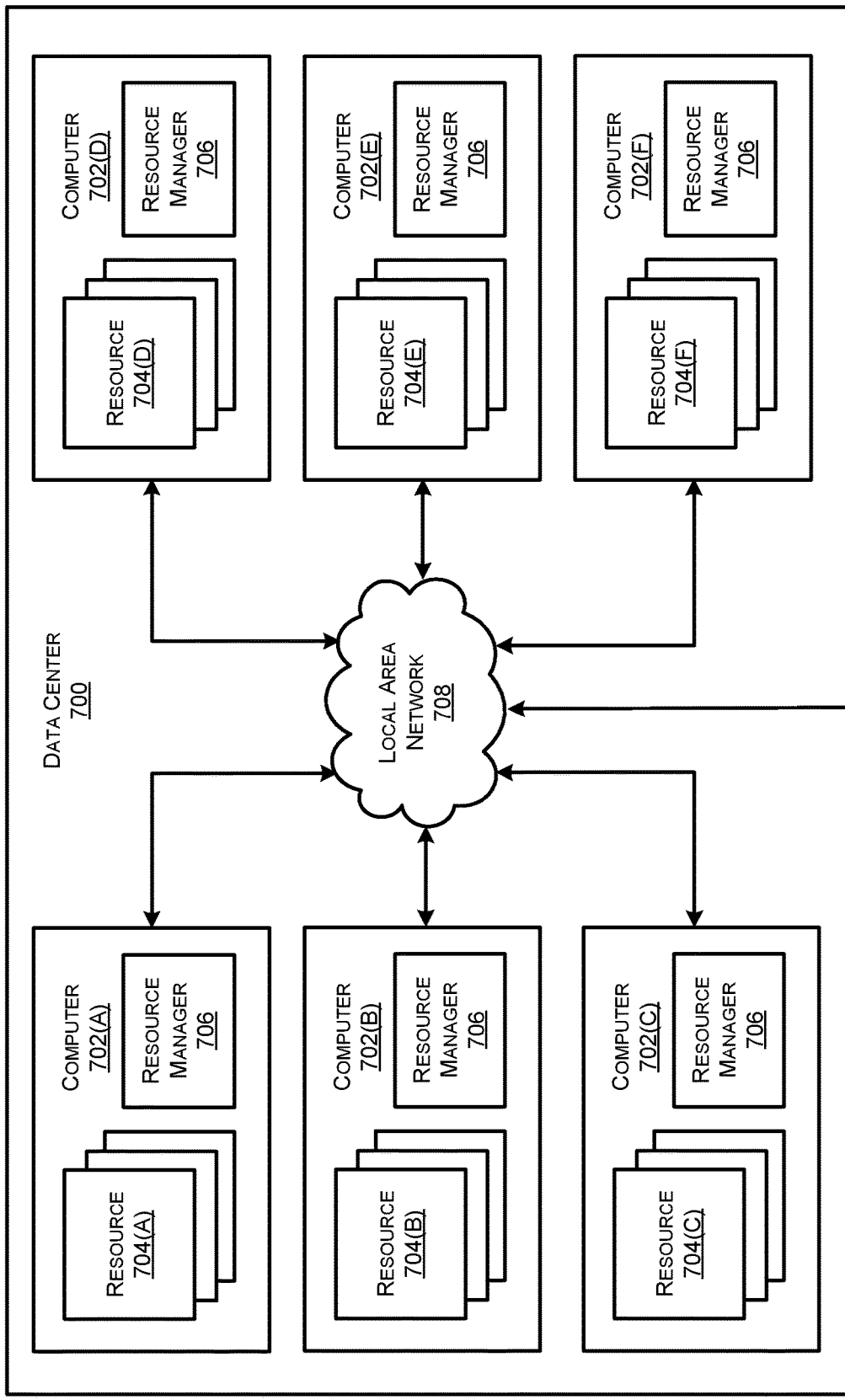
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several computers 702A-702F (which might be referred to herein singularly as "a computer 702" or in the plural as "the computers 702") for providing computing resources. In some examples, the resources and/or computers 702 may include, or correspond to, any type of networked device described herein, such as server device, application devices 106, and/or network devices 108. Although, computers 702 may comprise any type of networked device, such as servers, switches, routers, hubs, bridges, gateways, modems, repeaters, access points, hosts, etc.

The computers 702 can be standard tower, rack-mount, or blade server computers configured appropriately for providing computing resources. In some examples, the computers 702 may provide computing resources 704 including data processing resources such as virtual machine (VM) instances or hardware computing systems, database clusters, computing clusters, storage clusters, data storage resources, database resources, networking resources, and others. Some of the computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer 702. Computers 702 in the data center 700 can also be configured to provide network services and other types of services.

In the example data center 700 shown in FIG. 7, an appropriate local area network (LAN) 708 is also utilized to interconnect the computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the computers 702A-702F in each data center 700, and, potentially, between computing resources in each of the computers 702. It should be appreciated that the configuration of the data center 700 described with reference to FIG. 7 is merely illustrative and that other implementations can be utilized.

In some examples, the computers 702 may each execute one or more application containers and/or virtual machines to perform techniques described herein. For instance, the containers and/or virtual machines may serve as server devices, user devices, and/or routers in the computing network 102.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 7.

Figure 8:
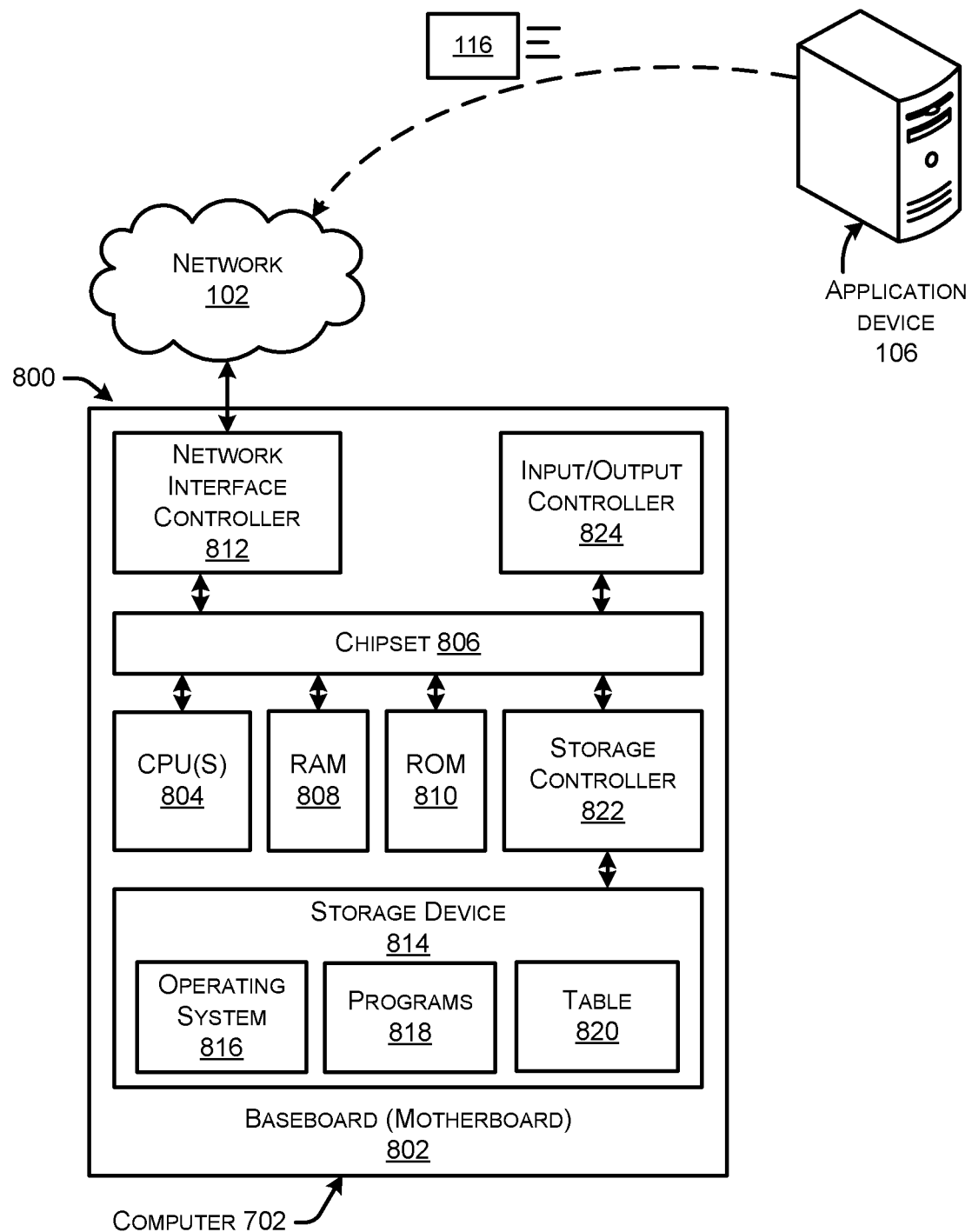
FIG. 8 is a computer architecture diagram showing an illustrative computer hardware architecture for implementing a device that can be utilized to implement aspects of the various technologies presented herein.

FIG. 8 shows an example computer architecture 800 for a computer 702 capable of executing program components for implementing the functionality described above. The computer architecture 800 shown in FIG. 8 illustrates a conventional server computer, workstation, desktop computer, laptop, tablet, network appliance, e-reader, smartphone, and/or other computing device, and can be utilized to execute any of the software components presented herein. The computer 702 may, in some examples, correspond to a physical device described herein (e.g., server device, network device, etc.), and may comprise networked devices such as servers, switches, routers, hubs, bridges, gateways, modems, repeaters, access points, etc. For instance, computer 702 may correspond to server device 104.

As shown in FIG. 8, the computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the networks 102 and/or 708. The chipset 806 can include functionality for providing network connectivity through a network interface controller (NIC) 812, such as a gigabit Ethernet adapter. The NIC 812 is capable of connecting the computer 702 to other computing devices over the network 102. For instance, in the example shown in FIG. 8, NIC 812 may help facilitate transfer of data, data collection requests (e.g., request 116), and/or communications related to sensor paths over the network 102 with application device(s) 106 and/or network device(s) 108. It should be appreciated that multiple NICs 812 can be present in the computer 702, connecting the computer to other types of networks and remote computer systems.

The computer 702 can be connected to a storage device 814 that provides non-volatile storage for the computer. The storage device 814 can store an operating system 816, programs 818, data table 820 (e.g., collector usage rate table 308), and/or other data. The storage device 814 can be connected to the computer 702 through a storage controller 822 connected to the chipset 806, for example. The storage device 814 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 814 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 814 is characterized as primary or secondary storage, and the like.

For example, the computer 702 can store information to the storage device 814 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 814 by detecting the physical states or characteristics of one or more particular locations within the physical storage units.

In addition to the mass storage device 814 described above, the computer 702 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 702. In some examples, the operations performed by the network 102, and or any components included therein, may be supported by one or more devices similar to computer 702. Stated otherwise, some or all of the operations performed by the network 102, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 814 can store an operating system 816 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 814 can store other system or application programs and data utilized by the computer 702.

In one embodiment, the storage device 814 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more devices, such as server device 104 and/or other devices. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by server device 104 and/or other devices. In some examples, the communications may include data, data collection requests, and/or communications related to sensor paths over the network 102, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 818 may comprise any type of programs or processes to perform the techniques described in this disclosure in accordance with data collection workload scheduling techniques. For instance, the programs 818 may cause the computer 702 to perform techniques for communicating with other devices using any type of protocol or standard usable for determining connectivity. Additionally, the programs 818 may comprise instructions that cause the computer 702 to perform the specific techniques for the scheduling of workloads related to data collection.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
obtaining a data collection request for data to be collected by a collector of a set of collectors, the data to be collected from a network device of a computing network, the data collection request including an indication of a sensor path from which the data are to be collected and a frequency at which the data are to be collected;
determining one or more attribute weights of the sensor path;
calculating a total sensor path weight for the sensor path based at least in part on the one or more attribute weights;
calculating a sensor path usage rate for the sensor path based at least in part on the frequency and the total sensor path weight;
selecting the collector from the set of collectors based at least in part on a cumulative usage rate of the collector relative to cumulative usage rates of individual collectors of the set of collectors; and
scheduling the data collection request with the collector.

2. The computer-implemented method of claim 1, wherein the one or more attributes weights include a sensor size attribute weight corresponding to an amount of the data collected from the sensor path.

3. The computer-implemented method of claim 2, wherein the amount of the data is represented as a byte collection size of the sensor path.

4. The computer-implemented method of claim 2, wherein the one or more attribute weights include a device attribute weight corresponding to a configuration of the network device.

5. The computer-implemented method of claim 4, wherein the device attribute weight is a scalar value, and the computer-implemented method further comprises:
calculating the total sensor path weight by applying the scalar value of the device attribute weight to the sensor size attribute weight.

6. The computer-implemented method of claim 1, wherein the one or more attribute weights include a priority attribute weight corresponding to a priority level of the sensor path.

7. The computer-implemented method of claim 1, further comprising:
obtaining a subsequent data collection request;
determining that the subsequent data collection request interferes with a currently scheduled data collection request at the collector;
un-scheduling the currently scheduled data collection request at the collector;

updating the cumulative usage rate of the collector to reflect the un-scheduling of the currently scheduled data collection request; and scheduling the subsequent data collection request with the collector.

8. The computer-implemented method of claim 1, wherein the data collection request corresponds to a yet another next generation (YANG) sensor path.

9. A server device comprising:
one or more processors; and
one or more non-transitory computer-readable media storing computer-executable instructions that, when executed by the one or more processors, cause the one or more processors to:
obtain a data collection request for data to be collected by a collector of a set of collectors, the data to be collected from a network device of a computing network, the data collection request including an indication of a sensor path from which the data are to be collected and a frequency at which the data are to be collected;
determine one or more attribute weights of the sensor path;
calculate a total sensor path weight for the sensor path based at least in part on the one or more attribute weights;
calculate a sensor path usage rate for the sensor path based at least in part on the frequency and the total sensor path weight;
select the collector from the set of collectors based at least in part on a cumulative usage rate of the collector relative to cumulative usage rates of individual collectors of the set of collectors; and
schedule the data collection request with the collector.

10. The server device of claim 9, wherein the one or more attributes weights include a sensor size attribute weight corresponding to an amount of the data collected from the sensor path.

11. The server device of claim 10, wherein the amount of the data is represented as a byte collection size of the sensor path.

12. The server device of claim 10, wherein the one or more attribute weights include a device attribute weight corresponding to a configuration of the network device.

13. The server device of claim 12, wherein the device attribute weight is a scalar value, and wherein the computer-executable instructions further cause the one or more processors to:
calculate the total sensor path weight by applying the scalar value of the device attribute weight to the sensor size attribute weight.

14. The server device of claim 9, wherein the one or more attribute weights include a priority attribute weight corresponding to a priority level of the sensor path.

15. The server device of claim 9, wherein the computer-executable instructions further cause the one or more processors to:
obtain a subsequent data collection request;
determine that the subsequent data collection request interferes with a currently scheduled data collection request at the collector;
un-schedule the currently scheduled data collection request at the collector;
update the cumulative usage rate of the collector to reflect the un-scheduling of the currently scheduled data collection request; and
schedule the subsequent data collection request with the collector.

16. The server device of claim 9, wherein the data collection request corresponds to a yet another next generation (YANG) sensor path.

17. A method comprising:
receiving a data collection request for data to be collected from a sensor path associated with a network device;
determining a sensor path weight of the sensor path based at least in part on at least one attribute of the sensor path;
determining a sensor path usage rate based at least in part on the sensor path weight and a frequency at which the data are to be collected, the frequency indicated in the data collection request;
assigning the data collection request to a collector;
determining a cumulative collector usage rate for the collector, the cumulative collector usage rate representing the sensor path usage rate of the data collection request and at least one additional sensor path usage rate of a previously assigned data collection request at the collector;
receiving a subsequent data collection request; and
assigning the subsequent data collection request to the collector based at least in part on comparing the cumulative collector usage rate of the collector with at least one other cumulative collector usage rate of another collector.

18. The method of claim 17, wherein the subsequent data collection request is assigned to the collector based on the cumulative collector usage rate of the collector being lower than the at least one other cumulative collector usage rate.

19. The method of claim 17, wherein the collector is part of a collector pool, and the cumulative collector usage rate of the collector is lower than the cumulative collector usage rates of other collectors in the collector pool.

20. The method of claim 17, wherein the at least one attribute is a sensor size attribute, a device attribute, or a priority attribute of the sensor path.

* * * * *